US009914880B2

(12) United States Patent
Fichtl et al.

(10) Patent No.: US 9,914,880 B2
(45) Date of Patent: Mar. 13, 2018

(54) METHOD OF INCREASING THE YIELD OF AVIATION FUEL FROM RENEWABLE FEEDSTOCKS

(71) Applicant: UOP LLC, Des Plaines, IL (US)

(72) Inventors: Geoffrey W. Fichtl, Chicago, IL (US); Daniel L. Ellig, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/296,987

(22) Filed: Oct. 18, 2016

(65) Prior Publication Data

US 2017/0158966 A1    Jun. 8, 2017

Related U.S. Application Data

(60) Provisional application No. 62/263,356, filed on Dec. 4, 2015.

(51) Int. Cl.
| | | |
|---|---|---|
| C10G 1/00 | (2006.01) | |
| C07C 1/00 | (2006.01) | |
| C07C 1/207 | (2006.01) | |
| C10L 1/04 | (2006.01) | |
| C10G 63/00 | (2006.01) | |
| C10G 3/00 | (2006.01) | |
| C10G 57/00 | (2006.01) | |

(52) U.S. Cl.
CPC .............. *C10G 3/50* (2013.01); *C10G 57/00* (2013.01); *C10G 2300/1011* (2013.01); *C10G 2300/202* (2013.01); *C10G 2300/301* (2013.01); *C10G 2400/08* (2013.01)

(58) Field of Classification Search
CPC .. C07C 1/20; C07C 1/207; C10G 1/00; C10G 63/00; C10L 1/04
USPC ........................ 585/240, 242; 208/49, 15, 16
See application file for complete search history.

(56) References Cited

U.S. PATENT DOCUMENTS

| | | | |
|---|---|---|---|
| 7,888,542 | B2 | 2/2011 | Koivusalmi et al. |
| 7,999,142 | B2 | 8/2011 | Kalnes et al. |

(Continued)

FOREIGN PATENT DOCUMENTS

WO    2011011588    1/2011

OTHER PUBLICATIONS

Chen et al., "Impact of composition and molecular structure upon the cold flow properties . . . ," Acta Petrolei Sinica (Petroleum Processing Section) (2009), 25(5), 673-677.

(Continued)

*Primary Examiner* — Thuan D Dang

(57) ABSTRACT

A method of increasing the yield of renewable aviation fuel is described. A renewable feedstock rich in fatty acids having between 8 and 14 carbon atoms is selected, and the selected feedstock is hydrogenated and deoxygenated in a first reaction zone to provide an effluent rich in normal paraffins having between 9 and 15 carbon atoms. The normal paraffins are isomerized in a second reaction zone to isomerize at least a portion of the normal paraffins. The isomerization reaction mixture may be separated into a product stream comprising a product rich in branched paraffins having between 9 and 15 carbon atoms, which has a higher yield than a product stream made using a renewable feedstock rich in fatty acids having more than 15 carbon atoms.

11 Claims, 2 Drawing Sheets

(56) References Cited

U.S. PATENT DOCUMENTS

| | | |
|---|---|---|
| 8,039,682 B2 | 10/2011 | McCall et al. |
| 8,193,399 B2 | 6/2012 | Gosling |
| 8,198,482 B2 | 6/2012 | Brady et al. |
| 8,198,492 B2 * | 6/2012 | Brady ............... C10G 3/46 44/605 |
| 8,304,592 B2 | 11/2012 | Luebke |
| 8,314,274 B2 | 11/2012 | Marker et al. |
| 8,471,079 B2 | 6/2013 | Brandvold et al. |
| 8,507,741 B2 | 8/2013 | Anumakonda et al. |
| 8,546,629 B2 | 10/2013 | Bozzano et al. |
| 8,753,853 B2 | 6/2014 | Ritter et al. |
| 8,916,739 B2 | 12/2014 | Fichtl et al. |
| 2011/0203253 A1 | 8/2011 | Derr et al. |
| 2012/0283491 A1 | 11/2012 | Zhou et al. |
| 2014/0005450 A1 | 1/2014 | Marker et al. |

OTHER PUBLICATIONS

Serrano et al., "Influence of blending vegetable oil methyl esters on biodiesel fuel properties: Oxidative stability and cold flow properties", Energy (2014), v.65, 109-115.

Bejan et al., "Effect of different alcohols and palm and palm kernel (palmist) oils on biofuel properties for special uses", Energy & Fuels (2014), 28(8), 5128-5135.

* cited by examiner

METHOD OF INCREASING THE YIELD OF AVIATION FUEL FROM RENEWABLE FEEDSTOCKS

CROSS-REFERENCE TO RELATED APPLICATION

This application claims priority from Provisional Application No. 62,263,356 filed Dec. 4, 2015, the contents of which are hereby incorporated by reference, the contents of which are hereby incorporated by reference in its entirety.

BACKGROUND OF THE INVENTION

As the demand for diesel fuel and aviation fuel increases worldwide there is increasing interest in sources other than petroleum crude oil for producing the fuels. One such source is what has been termed renewable sources. These renewable sources include, but are not limited to, plant oils such as corn, rapeseed, canola, soybean and algal oils, animal fats such as inedible tallow, fish oils and various waste streams such as yellow and brown greases and sewage sludge. The common feature of these sources is that they are composed of glycerides and free fatty acids (FFA). Both of these compounds contain aliphatic carbon chains having from about 8 to about 24 carbon atoms. The aliphatic carbon chains in the glycerides or FFAs can be saturated or mono-, di- or poly-unsaturated. The glycerides may be tri-glycerides, di-glycerides, mono-glycerides, or any combination thereof.

There are reports in the art disclosing the production of hydrocarbons from renewable sources. For example, U.S. Pat. No. 4,300,009 discloses the use of crystalline aluminosilicate zeolites to convert plant oils such as corn oil to hydrocarbons such as gasoline and chemicals such as paraxylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

Processes for producing two fuels, such as a diesel fuel and an aviation fuel, from renewable feedstocks are also known. The aviation fuel is produced via operation of the isomerization/cracking reactor in a higher severity mode to induce greater isomerization and cracking on longer chain n-paraffins (typically $nC_{15}$-$nC_{18}$), as well as catalyst selection.

As most natural oils that are used as feeds for making diesel and aviation fuel from renewable sources have fatty acid chain lengths of 16 to 18 carbon atoms, they are ideal for making diesel fuels. Deoxygenation of these oils results in $C_{15}$-$C_{18}$ normal paraffins which have poor cold-flow properties for diesel fuel. The normal paraffins are isomerized in an isomerization and selective hydrocracking reactor, in which the normal paraffins are converted into moderately branched isomers. This improves the cold-flow properties of the effluent fuel dramatically relative to the normal paraffins that resulted from deoxygenation.

However, in the production of aviation fuels from natural oils, the isomerization step must be run at higher severity to allow some diesel-range n-paraffins to be cracked or more heavily isomerized such that the resulting products boil in the jet range. This higher severity operation in the second stage results in product with lower boiling points and superior cold-flow properties than the feeds, but has the trade-off of producing increased amounts of naphtha and light ends at the expense of the aviation fuel component yield.

Therefore, there is a need for a process of producing aviation fuel at high yield from renewable feedstocks with lower quantities of naphtha and lights ends.

SUMMARY OF THE INVENTION

One aspect of the present invention is a method of increasing the yield of renewable aviation fuel. In one embodiment, the method includes selecting a renewable feedstock rich in fatty acids having between 8 and 14 carbon atoms. The selected feedstock is hydrogenated and deoxygenated in a first reaction zone in the presence of hydrogenating and deoxygenating catalyst at reaction conditions to provide a first effluent rich in normal paraffins having between 9 and 15 carbon atoms, hydrogen, water, and carbon oxides. The normal paraffins in the first effluent are isomerized in a second reaction zone in the presence of an isomerization catalyst at isomerization conditions to isomerize at least a portion of the normal paraffins to generate an isomerization reaction mixture comprising a product rich in branched paraffins having between 9 and 15 carbon atoms. This isomerization reaction mixture may be separated into a first product stream comprising the first product rich in branched paraffins having between 9 and 15 carbon atoms. The first product stream has a yield higher than the yield of a product stream made using a renewable feedstock rich in fatty acids having more than 15 carbon atoms.

DETAILED DESCRIPTION OF THE INVENTION

Figure 1:
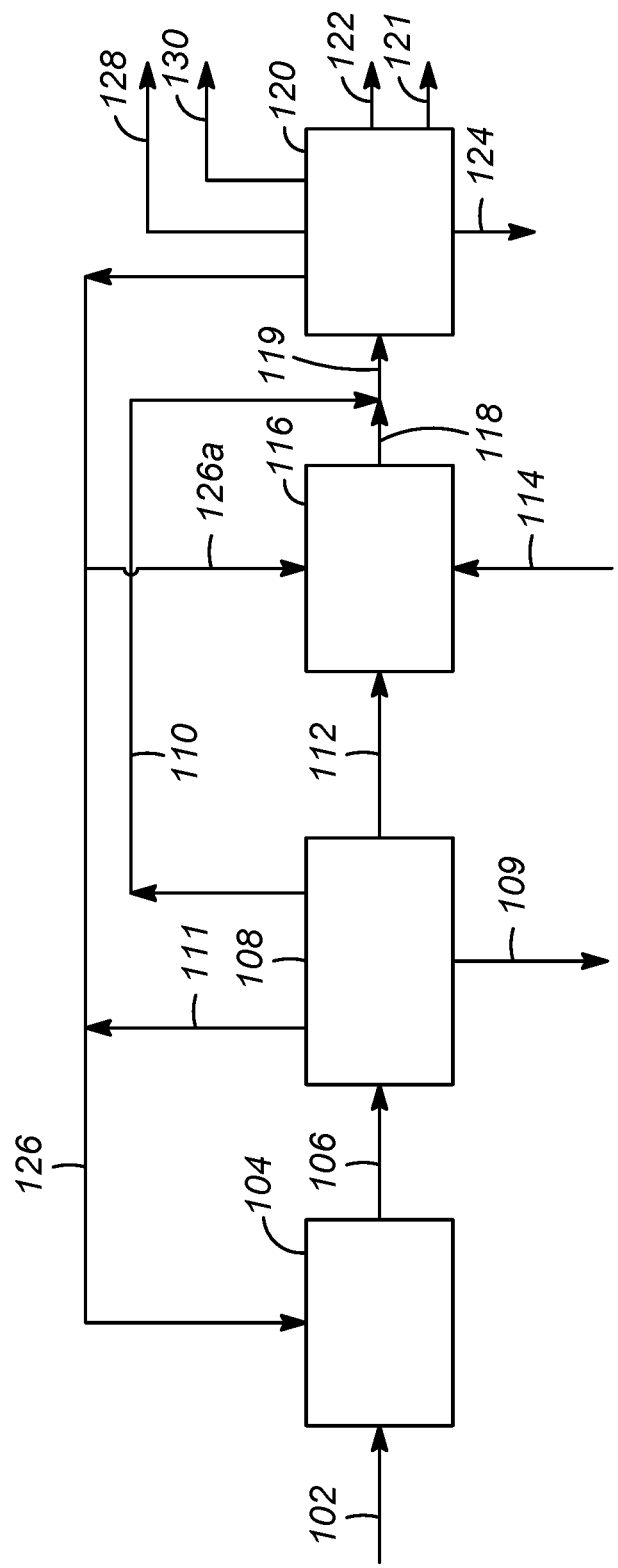
FIG. 1 illustrates one embodiment of the process of the present invention.

The present invention addresses the trade-off between the cold-flow properties for the aviation fuel and the increased amounts of naphtha and light ends at the expense of the aviation fuel component yield. The yield trade-off could be largely avoided if the normal paraffin feed to the isomerization section contained normal paraffins having less than 16 carbon atoms. A process has been developed in which the feed to the isomerization section contains normal paraffins rich in $C_9$-$C_{15}$ carbon atoms, and the isomerization section severity is tuned similarly to the diesel-mode operation when using a $C_{15}$-$C_{18}$-rich feed. In diesel-mode operation, the isomerization section is operated at a temperature lower than aviation-mode operation. In this case, the yield of aviation fuel is similarly high, and the yield of light ends and naphtha is similarly low compared to standard diesel-mode operation. As a result, the yield of aviation fuel (about 140° C. to about 280° C.) product from such an operation is improved compared to the yield of similar product when feeding a $C_{15}$-$C_{18}$-rich feed. In addition, in some embodiments, the aviation fuel product made with a $C_9$-$C_{15}$-rich feed has a lower freeze point relative to products made at similar conversion when feeding a $C_{15}$-$C_{18}$-rich feed. Aviation fuel produced from a $C_9$-$C_{15}$-rich feed would be ideal for producing jet fuels compliant with ASTM D7566 HEFA SPK specification, all without significantly sacrificing yield.

It has been shown that the isomerization/cracking of short-chain n-paraffins, e.g., normal $C_{14}$, produces a much greater yield of low-boiling aviation fuel product (about 140° C. to about 280° C.), often with lower freeze point, than can be achieved when isomerizing/cracking longer chain n-paraffins at similar levels of conversion, such as normal $C_{16}$ or normal $C_{20}$ paraffins. Similarly, in some embodiments, the yield of full range distillate (140° C.-371° C.) is higher at the same very low cloud point (e.g., about −15° C. or less) when feeding normal $C_{14}$ paraffins than when feeding longer chain paraffins, such as normal $C_{16}$, normal $C_{18}$, normal $C_{20}$, or other longer normal paraffins.

The present invention relates to a process for producing aviation fuel with a higher yield from renewable feedstocks such as those originating from plants or animals. The term renewable feedstock is meant to include feedstocks other than those obtained from petroleum crude oil. They can come from natural oils or free fatty acids, or genetically engineered oils or free fatty acids for example.

The renewable feedstock is rich in fatty acids having between 8 and 14 carbon atoms. By "rich in fatty acids having between 8 and 14 carbon atoms," we mean that the feedstock contains at least about 40 wt % of fatty acids having between 8 and 14 carbon atoms, or at least about 45 wt %, or at least about 50 wt %, or at least about 55 wt %, or at least about 60 wt %, or at least about 65 wt %, or at least about 70 wt %.

By "fatty acids having between 8 and 14 carbon atoms," we mean glycerides having fatty acids side chains having 8 to 14 carbon atoms, and free fatty acids having between 8 and 14 carbon atoms. They can come from natural oils, such as palm kernel oil, coconut oil, and babassu oil. Alternatively, the renewable feedstock can be a microbial oil rich in fatty acid chains having between 8 and 14 carbon atoms. Also, it may be desirable to engineer genetically modified organisms to produce such oils by design.

A renewable feedstock rich in fatty acids having between 8 and 14 carbon atoms may have fatty acids having carbons number above 14 or below 8, as would be understood by those of skill in the art. For example, coconut oil has about 70 to about 80 wt % fatty acids having between 8 and 14 carbon atoms, and about 20% fatty acids having 16 to 20 carbon atoms.

The renewable feedstock could be a single oil, or it could be a blend of oils, if desired. However, blending a feedstock rich fatty acids having between 8 and 14 carbon atoms with a feedstock rich in fatty acids having between carbon atoms outside the range of 8 to 14 would reduce the yield of aviation fuel, and thus is less desirable.

The process involves selecting a renewable feedstock rich in fatty acids having between 8 and 14 carbon atoms (which may also contain some fatty acids having 16 or more carbon atoms). The feedstock is hydrogenated and deoxygenated in a first reaction zone to provide an effluent comprising normal paraffins having between 7 and 14 carbon atoms, as well as some paraffins having 15 or more carbon atoms, along with other components, such as hydrogen, water, and carbon oxides.

The normal paraffins in the effluent are isomerized in a second reaction zone to isomerize at least a portion of the normal paraffins to generate an isomerization reaction mixture comprising a product rich in branched paraffins having between 9 and 15 carbon atoms. By the term rich in branched paraffins having between 9 and 15 carbon atoms, we mean that the product has a greater concentration of branched paraffins having between 9 and 15 carbon atoms than the stream entering the isomerization zone. It may comprise greater than about 50 mass % branched paraffins, or greater than about 60 mass %, or greater than about 70 mass %, or greater than about 80 mass %, or greater than about 90 mass %.

The isomerization reaction mixture can be separated into at least a product stream comprising the product rich in branched paraffins having between 9 and 15 carbon atoms. Additional streams could be formed, if desired.

The product stream has a higher yield, and in some cases a lower freeze point, compared to the freeze point of a product stream made using a renewable feedstock rich in fatty acids having more than 15 carbon atoms.

In some embodiments, the product stream can have a true boiling point in the range of about 140° C. to about 280° C. By "true boiling point," we mean the distillation temperature as measured by ASTM D 2892 or the simulated distillation temperature as measured by ASTM D 2887.

In some embodiments, the yield of the stream having a true boiling point in the range of about 140° C. to about 280° C. is greater than the yield of a stream having a true boiling point in the range of about 140° C. to about 280° C. made when starting with a renewable feedstock rich in fatty acids having more than 15 carbon atoms. By "rich in fatty acids having more than 15 carbon atoms," we mean oils or fatty acids having at least about 50 wt % of 15 or more carbon atoms (e.g., soybean oil or canola oil). The yield is the fraction or percentage of product produced calculated on the basis of a unit of feed converted.

In some embodiments, the normal paraffins having between 9 and 15 carbon atoms are separated from the effluent from the first reactor (which may contain normal paraffins having less than 9 carbon atoms and/or paraffins having more than 15 carbon atoms) before the normal paraffins are isomerized.

In some embodiments, the normal paraffins having less than 9 carbon atoms are separated from the effluent of the first reactor before the normal paraffins are isomerized. In some embodiments, the normal paraffins having more than 15 carbon atoms are separated from the effluent of the first reactor before the normal paraffins are isomerized.

In some embodiments, a portion of the normal paraffins in the first effluent can be recycled to the hydrogenation and deoxygenation reaction zone.

In some embodiments, the isomerization reaction mixture may also contain normal and branched paraffins having less than 9 carbon atoms (e.g., 7 or 8 carbon atoms) and/or more than 15 carbon atoms (e.g., 16 to 20 carbon atoms). The isomerization product mixture can be fractionated to provide a stream rich in branched paraffins having less than 9 carbon atoms and/or a stream rich in branched paraffins having more than 15 carbon atoms, as well as the first product stream rich in branched paraffins having between 9 and 15 carbon atoms. The stream rich in branched paraffins having less than 9 carbons has at least 70 wt % paraffins having less than 9 carbon atoms. The stream rich in branched paraffins having more than 15 carbons has at least 70 wt % paraffins having more than 15 carbon atoms.

The renewable feedstock may contain a variety of impurities, such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow.

Another way to remove contaminants is a mild acid wash. This is carried out by contacting the feedstock with an acid such as sulfuric acid, nitric acid, phosphoric acid, hydrochloric acid, or citric acid in a reactor. The acid and feedstock can be contacted either in a batch or continuous process. Contacting is done with a dilute acid solution usually at ambient temperature and atmospheric pressure. If the contacting is done in a continuous manner, it is usually done in a counter current manner. After contacting, a water phase, which is enriched with the contaminants, is removed from the oil using centrifugation, for example. The feedstock could be further treated by the addition of bleaching earth, which is an adsorbent clay material. The contaminants are adsorbed on the bleaching earth. After the bleaching earth has been in contact with the feedstock, it can be removed by filtration. Yet another possible means of removing metal contaminants from the feedstock is through the use of guard beds which are well known in the art. These can include alumina guard beds either with or without demetallation catalysts such as nickel or cobalt. Filtration and solvent extraction techniques are other choices which may be employed. Hydroprocessing, such as that described in U.S. Ser. No. 11/770,826, is another pretreatment technique which may be employed.

The renewable feedstock is flowed to a hydrogenation and deoxygenation zone comprising one or more catalyst beds in one or more reactors. The term renewable feedstock is meant to include feedstocks that have not been treated to remove contaminants as well as those feedstocks purified in a pretreatment zone. In this reaction zone, the renewable feedstock is contacted with a hydrogenation or hydrotreating catalyst in the presence of hydrogen at hydrogenation conditions to hydrogenate the olefinic or unsaturated portions of the n-paraffinic chains. Hydrogenation or hydrotreating catalysts are any of those well known in the art, such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina. Hydrogenation conditions include a temperature of about 200° C. to about 300° C. and a pressure of about 1379 kPa absolute (200 psia) to about 5516 kPa absolute (800 psia). Other operating conditions for the hydrogenation zone are well known in the art.

The hydrogenation and hydrotreating catalysts enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. Decarboxylation and decarbonylation conditions include a relatively low pressure of about 3447 kPa (500 psia) to about 6895 kPa (1000 psia), a temperature of about 260° C. to about 371° C., and a liquid hourly space velocity of about 1 to about 4 $hr^{-1}$. Since hydrogenation is an exothermic reaction, as the feedstock flows through the catalyst bed, the temperature increases, and decarboxylation and hydrodeoxygenation will begin to occur. Thus, it is envisioned and is within the scope of this invention that all three reactions occur simultaneously in one reactor or in one bed. Alternatively, the conditions can be controlled such that hydrogenation primarily occurs in one bed, and decarboxylation and/or hydrodeoxygenation occurs in a second bed. If only one bed is used, then hydrogenation may occur primarily at the front of the bed, while decarboxylation, decarbonylation and hydrodeoxygenation may occur mainly in the middle and bottom of the bed. Finally, desired hydrogenation can be carried out in one reactor, while decarboxylation, decarbonylation, and/or hydrodeoxygenation can be carried out in a separate reactor.

Hydrogen is a reactant in the reactions above, and to be effective, a sufficient quantity of hydrogen must be in solution to most effectively take part in the catalytic reaction.

In general, the hydrogenation and deoxygenation conditions include a temperature of about 200° C. to about 400° C. The operating pressure range can be about 1379 kPa absolute (200 psia) to about 13,790 kPa absolute (2000 psia), or about 1379 kPa (a) (200 psia) to about 6895 kPa (a) (1000 psia), about 1379 kPa absolute (200 psia) to about 4826 kPa absolute (700 psia), or about 2413 kPa absolute (350 psia) to about 4481 kPa absolute (650 psia), or about 2758 kPa absolute (400 psia) to about 4137 kPa absolute (600 psia). Furthermore, the rate of reaction may be increased, resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed, and reduction of the hydrogen requirements is beneficial from an economic standpoint.

In some embodiments, the hydrocarbon recycle (not shown) can be used to control the temperature in the reaction zones since the reactions are exothermic. In one embodiment of the invention, the volume ratio of hydrocarbon recycle to feedstock is from about 1.5:1 to about 8:1, or about 1.5:1 to about 7:1, or about 1.5:1 to about 6:1, or about 1.5:1 to about 5:1, or about 1.5:1 to about 4:1, or about 1.5:1 to about 3.5:1, or about 1.5:1 to about 3:1. The specific range of vol/vol ratios of recycle to feed is determined based on achieving suitable temperatures in the deoxygenation reaction zone.

The reaction product from the deoxygenation reactions in the hydrogenation and deoxygenation zone will comprise a liquid portion and a gaseous portion. The gaseous portion comprises hydrogen, carbon dioxide, carbon monoxide, water vapor, propane and perhaps sulfur components such as hydrogen sulfide, and/or nitrogen components such as ammonia. The separated gaseous portion comprises mostly hydrogen and the carbon oxides from the decarboxylation and decarbonylation reactions. The carbon dioxide can be removed from the hydrogen by means well known in the art, reaction with a hot carbonate solution, pressure swing absorption, etc. Also, absorption with an amine in processes, such as described in US Publication Nos. 2009/0082603 and 2009/0077868 which are hereby incorporated by reference, may be employed. If desired, essentially pure carbon dioxide can be recovered by regenerating the spent absorption media. The hydrogen remaining after the removal of the carbon dioxide may be recycled to either of the reaction zones. Water may also be removed from the hydrogenation and deoxygenation zone effluent.

The liquid portion, after water is removed, comprises a hydrocarbon fraction which is essentially all n-paraffins. Different feedstocks will result in different distributions of paraffins. A portion of this hydrocarbon fraction, after separation, may be used as the hydrocarbon recycle described above.

The liquid portion of the reaction product is contacted with an isomerization catalyst under isomerization conditions to at least partially isomerize the n-paraffins to branched-paraffins. The isomerization catalysts and operating conditions are selected so that the isomerization catalyst also catalyzes selective hydrocracking of the paraffins. The selective hydrocracking creates additional hydrocarbons in the aviation range. The effluent of the second reaction zone, the isomerization and selective hydrocracking zone, is a branched-paraffin-rich stream. Isomerization and selective hydrocracking can be carried out in a separate bed of the same reactor, described above or the isomerization and selective hydrocracking can be carried out in a separate reactor. For ease of description, the following will address the embodiment where a second reactor is employed for the isomerization and selective hydrocracking reactions.

The liquid portion of the deoxygenation reaction zone effluent is contacted with an isomerization and selective hydrocracking catalyst in the presence of hydrogen at isomerization and selective hydrocracking conditions to isomerize at least a portion of the normal paraffins to branched paraffins. Due to the presence of hydrogen, the reactions may be called hydroisomerization and hydrocracking.

The isomerization and selective hydrocracking of the paraffinic product can be accomplished in any manner known in the art or by using any suitable catalyst known in the art. One or more beds of catalyst may be used. It is preferred that the isomerization be operated in a co-current mode of operation. Fixed bed, trickle bed down flow or fixed bed liquid filled up-flow modes are both suitable.

At least a portion of the liquid portion of the effluent of the hydrogenation and deoxygenation reaction zone is contacted with an isomerization catalyst in the presence of hydrogen at isomerization conditions to isomerize the normal paraffins to branched paraffins and to selectively hydrocrack at least a portion of the paraffins. Due to the presence of hydrogen, the reactions may be called hydroisomerization and hydrocracking. The isomerization of the paraffinic product can be accomplished in any manner known in the art or by using any suitable catalyst known in the art. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials include aluminas, amorphous alumina, amorphous silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. No. 4,943,424; U.S. Pat. No. 5,087,347; U.S. Pat. No. 5,158,665; and U.S. Pat. No. 5,208,005. MgAPSO is a MeAPSO, which is an acronym for a metal aluminumsilicophosphate molecular sieve, where the metal Me is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. No. 5,510,306, U.S. Pat. No. 5,082,956, and U.S. Pat. No. 5,741,759.

The isomerization and selective hydrocracking catalyst may also comprise a modifier selected from the group consisting of lanthanum, cerium, praseodymium, neodymium, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. No. 4,310,440; U.S. Pat. No. 4,440,871; U.S. Pat. No. 4,793,984; U.S. Pat. No. 4,758,419; U.S. Pat. No. 4,943,424; U.S. Pat. No. 5,087,347; U.S. Pat. No. 5,158,665; U.S. Pat. No. 5,208,005; U.S. Pat. No. 5,246,566; U.S. Pat. No. 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2$:$Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The isomerization and selective hydrocracking catalyst may be any of those well known in the art such as those described and cited above. Isomerization and selective cracking conditions include a temperature of about 150° C. to about 360° C., or about 300° C. to about 360° C., and a pressure of about 1724 kPa absolute (250 psia) to about 4726 kPa absolute (700 psia), or about 3102 kPa absolute (450 psia) to about 3792 kPa absolute (550 psia). In some embodiments, the isomerization reaction zone is operated at a pressure less than the pressure of the hydrogenation and deoxygenation zone. Other operating conditions for the isomerization zone are well known in the art.

The effluent of the isomerization and selective hydrocracking zone is processed through one or more separation steps to obtain a purified hydrocarbon stream useful as an aviation fuel or aviation fuel blending component. Because the effluent comprises both a liquid and a gaseous component, the liquid and gaseous components are separated using a separator such as a cold separator. The separated liquid component contains the hydrocarbons useful as an aviation fuel, termed aviation fuel range hydrocarbons, as well as smaller amounts of naphtha and LPG. The separated liquid component is further purified in a product distillation zone which separates lower boiling components and dissolved gases into an LPG and naphtha stream and an aviation range product stream. The conditions of the distillation zone may be adjusted to control the amount of hydrocarbon contained in the aviation range product stream.

The LPG and naphtha stream may be further separated in a debutanizer or depropanizer in order to separate the LPG into an overhead stream, leaving the naphtha in a bottoms stream. The LPG may be sold as valuable product or may be used in other processes such as a feed to a hydrogen production facility. Similarly, the naphtha may be used in other processes, such as the feed to a hydrogen production facility.

The separated gaseous component comprises mostly hydrogen and in some embodiments may include some of the carbon dioxide from hydrogenation and deoxygenation reaction zone. If present, techniques to remove carbon oxides as discussed above. The hydrogen remaining after the removal of the carbon dioxide may be recycled to the reaction zone where hydrogenation primarily occurs and/or to any subsequent beds/reactors.

Depending upon the application, various additives may be combined with the aviation fuel composition generated in order to meet required specifications for different specific fuels. Therefore, the aviation range product, while possible to meet the requirement of a fuel, may be used as a component for a fuel. The product may be blended with other components to form an aviation fuel, or one or more additives may be added to the product in order to form the final aviation fuel.

For example, the aviation fuel composition generated herein complies with, is a blending component for, or may be combined with one or more additives to meet at least one of: ASTM D 1655 Specification for Aviation Turbine Fuels, ASTM 7566 Specification for Aviation Turbine Fuels Containing Synthesized Hydrocarbons, Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MIL-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification MIL-DTL-83133, which is a military grade type of highly refined kerosene based jet propellant specified by the United States Government. The fuel produced from glycerides and FAAs is very similar to isoparaffinic kerosene or iPK, also known as a synthetic jet fuel.

The specifications for different types of fuels are often expressed through acceptable ranges of chemical and physical requirements of the fuel. As stated above, aviation turbine fuels, a kerosene type fuel including JP-8, are specified by MIL-DTL-83133, JP-4, a blend of gasoline, kerosene and light distillates, is specified by MIL-DTL-5624 and JP-5 a kerosene type fuel with low volatility and high flash point is also specified by MIL-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the product of the present invention may meet fuel specifications, it is expected that some blending of the product with other blending components may be required to meet the desired set of fuel specifications. In other words, the aviation product of this invention is a composition which may be used with other components to form a fuel meeting at least one of the specifications for aviation fuel such as Jet A or Jet A-1. The desired renewable blending components are highly paraffinic distillate fuel components having a paraffin content of at least 75% by volume. The aviation fuel produced by the present process can be used as a blending component in an aviation fuel meeting the specifications of ASTM D7566.

In some embodiments, a portion of the effluent from the hydrogenation and deoxygenation reaction zone can be recycled back to the hydrogenating and deoxygenating reaction zone, if desired. A portion of a hydrocarbon stream may also be cooled down if necessary and used as cool quench liquid between the beds of the deoxygenation reaction zone to further control the heat of reaction and provide quench liquid for emergencies. The recycle stream may be introduced to the inlet of the deoxygenation reaction zone and/or to any subsequent beds or reactors. One benefit of hydrocarbon recycle is to control the temperature rise across the individual beds. Operating with high recycle and maintaining high levels of hydrogen in the liquid phase helps dissipate hot spots at the catalyst surface and reduces the formation of undesirable heavy components which lead to coking and catalyst deactivation.

One embodiment of the process is shown in FIG. 1. The renewable feedstock 102 enters hydrogenation and deoxygenation reaction zone 104 along with recycle hydrogen 126. Hydrogenation and deoxygenation zone effluent 106 is separated in a separation zone 108. At least carbon oxides and water vapor are removed in line 110 and hydrogen is optionally removed in line 111. Optionally, line 111 can be eliminated and the hydrogen carried in line 110 with the carbon oxides and water vapor. Additional water may optionally be removed in line 109 depending upon the units employed and the operating conditions of separation zone 108. Separated hydrogenated and deoxygenated paraffins are passed via line 112 to isomerization and selective hydrocracking zone 116 along with optional recycle hydrogen 126 and optional make-up hydrogen 114. Isomerization and selective hydrocracking zone effluent 118 is combined with line 110 to form combined stream 119 and passed to product recovery zone 120. Carbon oxide stream 128, light ends stream 130, water byproduct stream 124, hydrogen stream 126, a diesel range product 121, and an aviation range product 122 are removed from product recovery zone 120. Aviation range product 122 may be used as an aviation fuel, or as a blending component for an aviation fuel.

EXAMPLES

Figure 2:
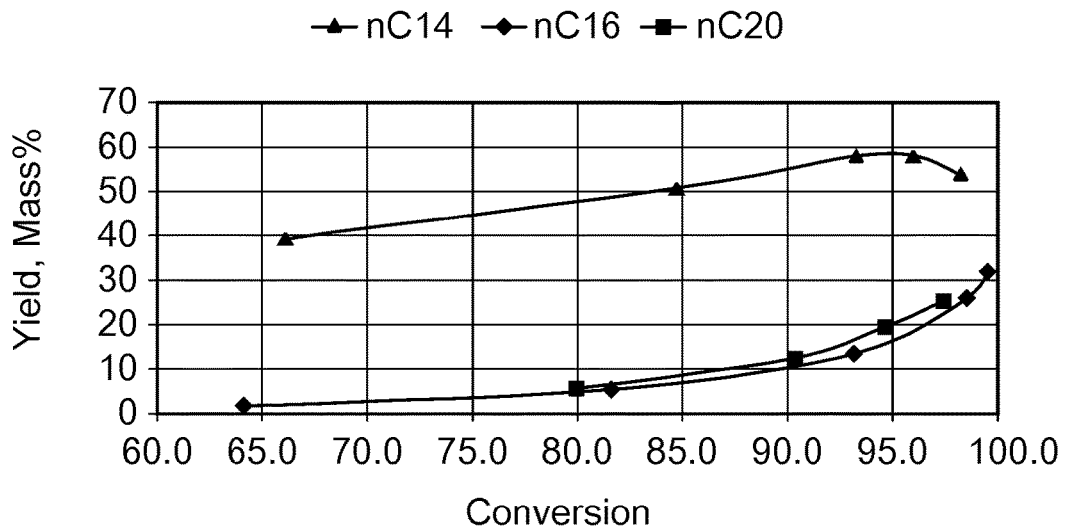
FIG. 2 is a graph showing yield as a function of conversion for various carbon chain lengths.

FIG. 2 shows the yield of light distillate (typical jet fuel boiling range material, e.g., about 140° C. to about 250° C.) obtained for pure $n\text{-}C_{14}$, $n\text{-}C_{16}$, and $n\text{-}C_{20}$ feedstocks at various levels of overall n-paraffin conversion. The yield of light distillate is dramatically higher when starting with n-$C_{14}$ feed, whereas both n-$C_{16}$, and n-$C_{20}$ feeds produce similar, but much lower, amounts of light distillate. The high yield of light distillate from n-$C_{14}$ feed is primarily due to n-$C_{14}$ having a boiling point that is already close to the jet boiling range. For a given level of light distillate yield, only mild levels of conversion, primarily isomerization conversion, and, to a lesser degree, cracking conversion, are required to increase the yield of light distillate. In contrast, n-$C_{16}$ and n-$C_{20}$ have normal boiling points that are firmly above the jet boiling range, such that primarily cracking conversion is required to crack feed components into the jet boiling range to increase light distillate yield. Cracking conversion inevitably produces byproduct light ends that fall outside the jet boiling range and depress light distillate yield. Therefore, when the primary production goal is to make jet-boiling-range material, it is beneficial to process feedstocks that are near the jet boiling range and make use primarily of the isomerization function, rather than cracking function, of the catalyst.

Figure 3:
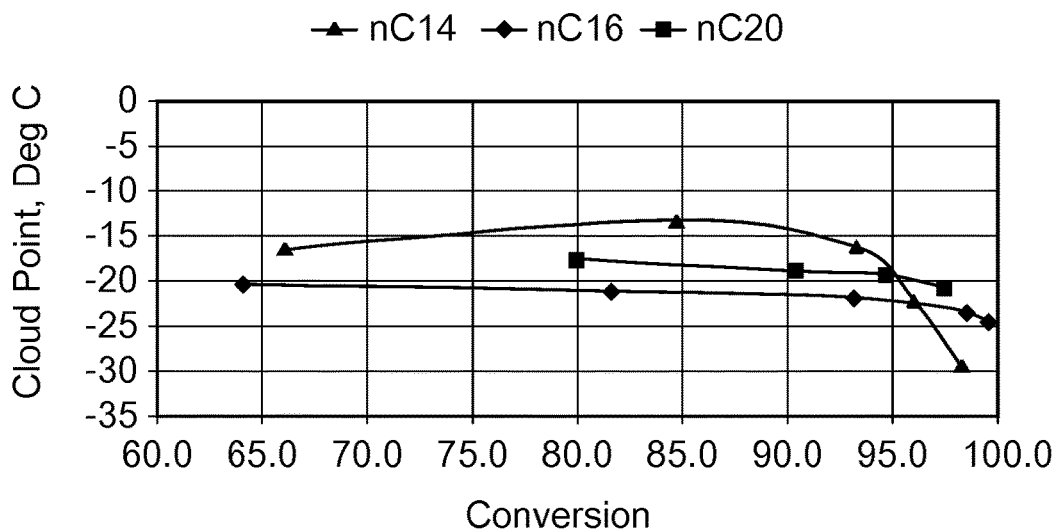
FIG. 3 is a graph showing cloud point as a function of conversion for various carbon chain lengths.

FIG. 3 shows estimated cloud point of the same light distillate described in FIG. 2 at various levels of overall n-paraffin conversion. The plot shows that with the three differing feedstocks, roughly the same cold flow properties can be achieved at about 96% overall n-paraffin conversion. The cloud point was calculated using the heat of fusion method for estimating cloud point from composition data described in S. R. Reddy, A thermodynamic model for predicting n-paraffin crystallization in diesel fuels, Fuel, 1986, Vol. 65, No. 12, pp 1647-1652. This method has been shown to provide very accurate estimates of cloud point for renewable jet and diesel fuel. Although freeze point is more important for jet fuel, the output of the Reddy method estimates cloud point. The cloud point and freeze point for jet fuel should trend in the same direction.

FIGS. 2 and 3 together illustrate the sharp advantage that processing feedstocks that are tailored to have specific carbon chain lengths can deliver. Similar or lower cold flow properties can be achieved at equivalent levels of conversion and much higher light distillate yields when processing feeds of carbon chain length that are close to the jet fuel boiling range. Such feeds offer flexibility to the operator to adjust conversion to optimize yield, tune cold flow properties to meet product specifications, and maximize run lengths.

As used herein, the term "zone" can refer to an area including one or more equipment items and/or one or more sub-zones. Equipment items can include one or more reactors or reactor vessels, heaters, exchangers, pipes, pumps, compressors, controllers and columns. Additionally, an equipment item, such as a reactor, dryer, or vessel, can further include one or more zones or sub-zones.

By the term "about," we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

SPECIFIC EMBODIMENTS

While the following is described in conjunction with specific embodiments, it will be understood that this description is intended to illustrate and not limit the scope of the preceding description and the appended claims.

A first embodiment of the invention is a method of increasing a yield of renewable aviation fuel comprising selecting a renewable feedstock rich in fatty acids having between 8 and 14 carbon atoms; hydrogenating and deoxygenating the selected feedstock in a first reaction zone in the presence of hydrogenating and deoxygenating catalyst at reaction conditions to provide a first effluent comprising normal paraffins having between 9 and 15 carbon atoms, hydrogen, water, and carbon oxides; isomerizing the normal paraffins in the first effluent in a second reaction zone in the presence of an isomerization catalyst at isomerization conditions to isomerize at least a portion of the normal paraffins to generate an isomerization reaction mixture comprising a first product rich in branched paraffins having between 9 and 15 carbon atoms; and separating the isomerization reaction mixture into at least a first product stream comprising the first product rich in branched paraffins having between 9 and 15 carbon atoms; wherein the yield of the first product stream is higher than a yield of a product stream made using a renewable feedstock rich in fatty acids having more than 15 carbon atoms. An embodiment of the invention is one, any or all of prior embodiments in this paragraph up through the first embodiment in this paragraph wherein the renewable feedstock is selected from palm kernel oil, coconut oil, babassu oil, and microbial oils rich in fatty acid chains having between 8 and 14 carbon atoms. An embodiment of the invention is one, any or all of prior embodiments in this paragraph up through the first embodiment in this paragraph wherein the first product stream has a true boiling point in a range of about 140° C. to about 280° C. An embodiment of the invention is one, any or all of prior embodiments in this paragraph up through the first embodiment in this paragraph wherein a freeze point of the first product stream having the true boiling point in a range of about 140° C. to about 280° C. is less than a freeze point of a stream having a true boiling point in a range of about 140° C. to about 280° C. made using the renewable feedstock rich in fatty acids having more than 15 carbon atoms. An embodiment of the invention is one, any or all of prior embodiments in this paragraph up through the first embodiment in this paragraph wherein separating the isomerization reaction mixture into the at least the first product stream comprises separating the isomerization reaction mixture into the at least the first product stream and a stream rich in branched paraffins having less than 9 carbon atoms. An embodiment of the invention is one, any or all of prior embodiments in this paragraph up through the first embodiment in this paragraph wherein separating the isomerization reaction mixture into the at least the first product stream comprises separating the isomerization reaction mixture into the at least the first product stream and a stream rich in branched paraffins having more than 15 carbon atoms. An embodiment of the invention is one, any or all of prior embodiments in this paragraph up through the first embodiment in this paragraph further comprising separating the normal paraffins having between 9 and 15 carbon atoms from the first effluent before isomerizing the normal paraffins in the first effluent. An embodiment of the invention is one, any or all of prior embodiments in this paragraph up through the first embodiment in this paragraph further comprising recycling a portion of the normal paraffins in the first effluent to the first reaction zone. An embodiment of the invention is one, any or all of prior embodiments in this paragraph up through the first embodiment in this paragraph wherein the reaction conditions of the first reaction zone include a temperature of about 200° C. to about 400° C., and a pressure of about 1379 kPa (a) (200 psia) to about 6895 kPa (a) (1000 psia). An embodiment of the invention is one, any or all of prior embodiments in this paragraph up through the first embodiment in this paragraph wherein the isomerization conditions of the second reaction zone include a temperature of about 150° C. to about 360° C., and a pressure of about 1724 kPa (a) (250 psia) to about 4826 mPa (a) (700 psia). An embodiment of the invention is one, any or all of prior embodiments in this paragraph up through the first embodiment in this paragraph wherein the second reaction zone is operated at a pressure lower than the pressure of the first reaction zone. An embodiment of the invention is one, any or all of prior embodiments in this paragraph up through the first embodiment in this paragraph further comprising pretreating the renewable feedstock in a pretreatment zone at pretreatment conditions to remove at least a portion of contaminants in the renewable feedstock.

A second embodiment of the invention is a method increasing a yield of renewable aviation fuel comprising selecting a renewable feedstock rich in fatty acids having between 8 and 14 carbon atoms, wherein the renewable feedstock is selected from palm kernel oil, coconut oil, babassu oil, castor oil, and microbial oils rich in fatty acid chains having between 8 and 14 carbon atoms; hydrogenating and deoxygenating the selected feedstock in a first reaction zone in the presence of hydrogenating and deoxygenating catalyst at reaction conditions to provide a first effluent comprising normal paraffins having between 9 and 15 carbon atoms, hydrogen, water, and carbon oxides; isomerizing the normal paraffins in the first effluent in a second reaction zone in the presence of an isomerization catalyst at isomerization conditions to isomerize at least a portion of the normal paraffins to generate an isomerization reaction mixture comprising a first product rich in branched paraffins having between 9 and 15 carbon atoms; separating the isomerization reaction mixture into at least a first product stream comprising the first product rich in branched paraffins having between 9 and 15 carbon atoms; wherein a yield of the first product stream is higher than a yield of a product stream made using a renewable feedstock rich in fatty acids having more than 15 carbon atoms. An embodiment of the invention is one, any or all of prior embodiments in this paragraph up through the second embodiment in this paragraph wherein the first product stream has a true boiling point in a range of about 140° C. to about 280° C. An embodiment of the invention is one, any or all of prior embodiments in this paragraph up through the second embodiment in this paragraph, wherein a freeze point of the stream having the true boiling point in the range of about 140° C. to about 280° C. is less than a freeze point of a stream having a true boiling point in a range of about 140° C. to about 280° C. made using the renewable feedstock rich in fatty acids having more than 16 carbon atoms. An embodiment of the invention is one, any or all of prior embodiments in this paragraph up through the second embodiment in this paragraph wherein separating the isomerization reaction mixture into the at least the first product stream comprises separating the isomerization reaction mixture into the at least the first product stream and a stream rich in branched paraffins having less than 9 carbon atoms. An embodiment of the invention is one, any or all of prior embodiments in this paragraph up through the second embodiment in this paragraph wherein separating the isomerization reaction mixture into the at least the first product stream comprises separating the isomerization reaction mixture into the at least the first product stream and a stream rich in branched paraffins having more than 15 carbon atoms. An embodiment of the invention is one, any or all of prior embodiments in this paragraph up through the second embodiment in this paragraph wherein the reaction conditions of the first reaction zone include a temperature of about 200° C. to about 400° C., and a pressure of about 1379 kPa (a) (200 psia) to about 6895 kPa (a) (1000 psia). An embodiment of the invention is one, any or all of prior embodiments in this paragraph up through the second embodiment in this paragraph wherein the isomerization conditions of the second reaction zone include a temperature of about 150° C. to about 360° C., and a pressure of about 1724 kPa (a) (250 psia) to about 4826 mPa (a) (700 psia). An embodiment of the invention is one, any or all of prior embodiments in this paragraph up through the second embodiment in this paragraph further comprising pretreating the renewable feedstock in a pretreatment zone at pretreatment conditions to remove at least a portion of contaminants in the renewable feedstock.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method of increasing a yield of renewable aviation fuel having a true boiling point in a range of about 140° C. to about 280° C. comprising:
    selecting a renewable feedstock comprising at least 55 mass % fatty acids having between 8 and 14 carbon atoms;
    hydrogenating and deoxygenating the selected feedstock in a first reaction zone in the presence of hydrogenating and deoxygenating catalyst at reaction conditions to provide a first effluent comprising normal paraffins having between 9 and 15 carbon atoms, hydrogen, water, and carbon oxides;
    isomerizing the normal paraffins having between 9 and 15 carbon atoms in the first effluent under isomerization conditions in a second reaction zone in the presence of an isomerization catalyst also selectively hydrocracking the normal paraffins to create additional hydrocarbons in the aviation range to generate an isomerization reaction mixture comprising a first product having at least 50 mass % branched paraffins having between 9 and 15 carbon atoms with a yield of renewable aviation fuel having a true boiling point in a range of about 140° C. to about 280° C. of at least 40 mass %; and separating the isomerization reaction mixture into at least a first product stream comprising the first product rich in branched paraffins having between 9 and 15 carbon atoms.

2. The method of claim 1 wherein the renewable feedstock is selected from palm kernel oil, coconut oil, babassu oil, and microbial oils rich in fatty acid chains having between 8 and 14 carbon atoms.

3. The method of claim 1 wherein a freeze point of the first product stream having the true boiling point in a range of about 140° C. to about 280° C. is less than a freeze point of a stream having a true boiling point in a range of about 140° C. to about 280° C. made using the renewable feedstock rich in fatty acids having more than 15 carbon atoms.

4. The method of claim 1 wherein separating the isomerization reaction mixture into the at least the first product stream comprises separating the isomerization reaction mixture into the at least the first product stream and a stream rich in branched paraffins having less than 9 carbon atoms.

5. The method of claim 1 wherein separating the isomerization reaction mixture into the at least the first product stream comprises separating the isomerization reaction mixture into the at least the first product stream and a stream rich in branched paraffins having more than 15 carbon atoms.

6. The method of claim 1 further comprising separating the normal paraffins having between 9 and 15 carbon atoms from the first effluent before isomerizing the normal paraffins in the first effluent.

7. The method of claim 1 further comprising recycling a portion of the normal paraffins in the first effluent to the first reaction zone.

8. The method of claim 1 wherein the reaction conditions of the first reaction zone include a temperature of about 200° C. to about 400° C., and a pressure of about 1379 kPa (a) (200 psia) to about 6895 kPa (a) (1000 psia).

9. The method of claim 1 wherein the isomerization conditions of the second reaction zone include a temperature of about 150° C. to about 360° C., and a pressure of about 1724 kPa (a) (250 psia) to about 4826 mPa (a) (700 psia).

10. The method of claim 1 wherein the second reaction zone is operated at a pressure lower than the pressure of the first reaction zone.

11. The method of claim 1 further comprising pretreating the renewable feedstock in a pretreatment zone at pretreatment conditions to remove at least a portion of contaminants in the renewable feedstock.

\* \* \* \* \*